United States Patent
Suyama

(10) Patent No.: US 10,297,886 B2
(45) Date of Patent: May 21, 2019

(54) ELECTROLYTE FOR METAL-AIR BATTERIES, AND METAL-AIR BATTERY

(71) Applicant: TOYOTA JIDOSHA KABUSHIKI KAISHA, Toyota-shi, Aichi-ken (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 15/195,372

(22) Filed: Jun. 28, 2016

(65) Prior Publication Data

US 2017/0018827 A1    Jan. 19, 2017

(30) Foreign Application Priority Data

Jul. 13, 2015   (JP) ................................ 2015-140035

(51) Int. Cl.
| | | |
|---|---|---|
| *H01M 4/38* | (2006.01) | |
| *H01M 4/46* | (2006.01) | |
| *H01M 12/06* | (2006.01) | |

(52) U.S. Cl.
CPC .............. *H01M 12/06* (2013.01); *H01M 4/38* (2013.01); *H01M 4/463* (2013.01); *H01M 4/466* (2013.01); *H01M 2300/0014* (2013.01)

(58) Field of Classification Search
CPC ........ H01M 12/06; H01M 4/38; H01M 4/463; H01M 4/466; H01M 2300/0014
See application file for complete search history.

(56) References Cited

U.S. PATENT DOCUMENTS

| | | | | |
|---|---|---|---|---|
| 2,800,520 | A * | 7/1957 | McGraw ............. | H01M 4/5825 429/207 |
| 3,682,707 | A * | 8/1972 | Burchardt ................ | H01M 8/08 429/501 |
| 4,273,841 | A * | 6/1981 | Carlson ................. | H01M 10/26 429/199 |
| 4,333,993 | A * | 6/1982 | Gibbard ................ | H01M 12/06 429/219 |
| 5,124,120 | A * | 6/1992 | Sklarchuck ............... | C22C 1/04 419/47 |
| 5,372,691 | A * | 12/1994 | Kao .................... | H01M 2/1083 204/265 |
| 7,763,385 | B2 | 7/2010 | Pozin et al. | |
| 2001/0012586 | A1 | 8/2001 | Hong et al. | |
| 2003/0077512 | A1* | 4/2003 | Charkey ............... | H01M 4/244 429/207 |
| 2007/0099050 | A1* | 5/2007 | Pozin .................... | H01M 4/244 429/406 |
| 2007/0113875 | A1 | 5/2007 | Wang et al. | |
| 2008/0096061 | A1* | 4/2008 | Burchardt ........... | H01M 4/8652 429/405 |
| 2008/0305389 | A1* | 12/2008 | Arora .................... | H01M 2/162 429/145 |
| 2012/0141889 | A1 | 6/2012 | Lee et al. | |
| 2012/0293110 | A1* | 11/2012 | Frederick ................ | H01M 4/46 320/101 |
| 2012/0328963 | A1* | 12/2012 | Yamaguchi .............. | C21D 1/06 429/405 |
| 2015/0010833 | A1 | 1/2015 | Amendola et al. | |
| 2015/0357859 | A1 | 12/2015 | Pourdarvish et al. | |
| 2016/0204445 | A1 | 7/2016 | Jung et al. | |
| 2016/0240890 | A1 | 8/2016 | Park et al. | |

FOREIGN PATENT DOCUMENTS

| | | |
|---|---|---|
| JP | 2012-015025 A | 1/2012 |
| JP | 2014-139878 A | 7/2014 |
| JP | 2015-090860 A | 5/2015 |

OTHER PUBLICATIONS

Apr. 12, 2018 Office Action issued in U.S. Appl. No. 15/258,465.
Aug. 31, 2018 Office Action issued in U.S. Appl. No. 15/258,465.
Dec. 31, 2018 Notice of Allowance issued in U.S. Appl. No. 15/258,465.

* cited by examiner

*Primary Examiner* — Gregg Cantelmo
(74) *Attorney, Agent, or Firm* — Oliff PLC

(57) ABSTRACT

An electrolyte for metal-air batteries, which is able to inhibit self-discharge of metal-air batteries, and a metal-air battery using the electrolyte. The electrolyte for metal-air batteries containing an aqueous solution that comprises at least one self-discharge inhibitor selected from the group consisting of $M_2HPO_4$, $M_3PO_4$, $M_4P_2O_7$, $MH_2PO_2$, $M_2H_2P_2O_7$, $LHPO_4$, $MLPO_4$, $L_2P_2O_7$ and $LH_2P_2O_7$, where M is any one selected from the group consisting of Li, K, Na, Rb, Cs and Fr, and L is any one selected from the group consisting of Mg, Ca, Sr, Ba and Ra.

12 Claims, 1 Drawing Sheet

(12) United States Patent

ELECTROLYTE FOR METAL-AIR BATTERIES, AND METAL-AIR BATTERY

This application claims priority to Japanese Patent Application No. 2015-140035, filed Jul. 13, 2015. The entire contents of the prior application are hereby incorporated by reference herein in their entirety.

TECHNICAL FIELD

The disclosure relates to an electrolyte for metal-air batteries, and a metal-air battery.

BACKGROUND

An air battery in which oxygen is used as an active material, has many advantages such as high energy density. Well-known examples of air batteries include metal-air batteries such as an aluminum-air battery and a magnesium-air battery.

As a technique relating to such air batteries, an aluminum-air battery including a cathode (air electrode), an electrolyte and an anode in which an aluminum metal is used, is disclosed in Patent Literature 1, for example.

Patent Literature 1: Japanese Patent Application Laid-Open No. 2014-139878

However, metal-air batteries using a metal such as aluminum or magnesium in the anode, have a problem of self-discharge.

SUMMARY

The disclosed embodiments were achieved in light of the above circumstance. An object of disclosed embodiments is to provide an electrolyte for metal-air batteries, which is able to inhibit the self-discharge of metal-air batteries, and a metal-air battery using the electrolyte.

In a first embodiment, there is provided an electrolyte for metal-air batteries having an anode containing at least one of aluminum and magnesium, the electrolyte comprising an aqueous solution comprising at least one self-discharge inhibitor selected from the group consisting of $M_2HPO_4$, $M_3PO_4$, $M_4P_2O_7$, $MH_2PO_2$, $M_2H_2P_2O_7$, $LHPO_4$, $MLPO_4$, $L_2P_2O_7$ and $LH_2P_2O_7$, where M is any one selected from the group consisting of Li, K, Na, Rb, Cs and Fr, and L is any one selected from the group consisting of Mg, Ca, Sr, Ba and Ra.

According to embodiments, the self-discharge inhibitor is $Na_2H_2P_2O_7$.

According to embodiments, a content of the self-discharge inhibitor is in the range of 0.001 mol/L or more to 0.1 mol/L or less.

According to embodiments, the aqueous solution is basic.

According to embodiments, the aqueous solution further comprises an electrolyte salt.

According to embodiments, the electrolyte salt is NAOH.

According to embodiments, a content of the electrolyte salt is in the range of 0.01 mol/L or more to 20 mol/L or less.

In another embodiment, there is provided a metal-air battery comprising an air electrode configured to receive an oxygen supply; an anode containing at least one of aluminum and magnesium; and an electrolyte as set forth above, the electrolyte being in contact with the air electrode and the anode.

According to embodiments, the metal-air battery further comprises a separator disposed between the air electrode and the anode, the separator configured to retain the electrolyte.

According to embodiments, the separator is porous.

According to embodiments, the porosity of the separator is in the range of 30% to 90%.

According to embodiments, a thickness of the air electrode is in the range of 2 μm to 500 μm.

According to embodiments, the aluminum is an aluminum metal containing impurities, and an element ratio of the aluminum in the aluminum metal is in the range of 50% or more to 99.99% or less.

According to embodiments, the aluminum is an aluminum alloy, and a content of the aluminum in the aluminum alloy is 50% by mass or more.

According to the disclosed embodiments, the self-discharge of metal-air batteries can be inhibited.

DETAILED DESCRIPTION

1. Electrolyte for Metal-Air Batteries

Figure 1:
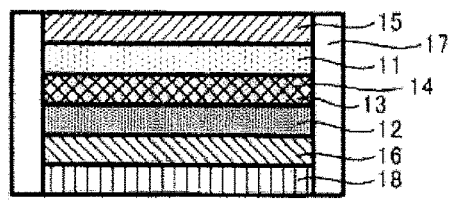
FIG. 1 is a sectional view of a schematic configuration of the metal-air battery according to an embodiment.

The electrolyte for metal-air batteries according to embodiments is an electrolyte for metal-air batteries having an anode containing at least one of aluminum and magnesium, the electrolyte comprising an aqueous solution comprising at least one self-discharge inhibitor selected from the group consisting of $M_2HPO_4$, $M_3PO_4$, $M_4P_2O_7$, $MH_2PO_2$, $M_2H_2P_2O_7$, $LHPO_4$, $MLPO_4$, $L_2P_2O_7$ and $LH_2P_2O_7$, where M is any one selected from the group consisting of Li, K, Na, Rb, Cs and Fr, and L is any one selected from the group consisting of Mg, Ca, Sr, Ba and Ra.

A metal-air battery including an anode that contains at least one of aluminum and magnesium, causes heavy self-discharge when the anode is brought in contact with the electrolyte; therefore, it has a problem of large battery capacity loss.

The self-discharge reaction of the metal-air battery is caused when a local cell is formed due to a potential difference between the main element (Al, Mg) of the metal contained in the anode (hereinafter it may be referred to as anode metal) and impurity elements (e.g., iron) contained in the metal. For example, in the case where the main element of the metal is aluminum, iron, which is one of the impurity elements, serves as the cathode. In the cathode, a reductive decomposition reaction of water is developed on the iron surface. In the anode, an oxidation reaction of the aluminum (that is, an elution reaction induced by ionization) is developed.

Meanwhile, in the case where a high-purity metal is used as the anode metal, self-discharge is less likely to occur. However, it is problematic in that there is an increase in cost and makes practical application difficult.

It was found that the self-discharge of the metal-air battery can be inhibited by adding the discharge inhibitor to the electrolyte.

According to the electrolyte of the disclosed embodiments, upon the discharge of the metal-air battery, anions contained in the self-discharge inhibitor preferentially adsorb onto the surface of the impurity metals contained in the anode metal, such as iron, so that direct contact of the impurity metals with the electrolyte is inhibited. As a result, it is considered that the local cell formation is inhibited, so that the self-discharge of the metal-air battery is inhibited.

As the anions contained in the self-discharge inhibitor, at least one kind of anions selected from the group consisting of $PO_2^{3-}$, $PO_4^{3-}$ and $P_2O_7^{4-}$ are preferred. Of them, $P_2O_7^{4-}$ is particularly preferred.

Cations are contained in the self-discharge inhibitor. As the cations, at least one kind of cations selected from the group consisting of Li, K, Na, Rb, Cs, Fr, Mg, Ca, Sr, Ba and Ra are preferred. Of them, $K^+$ and $Na^+$ are more preferred, and $Na^+$ is still more preferred. The cations are those of a metal that is electrochemically baser than aluminum and magnesium. Accordingly, the cations are less reactive with aluminum and magnesium, which serve as anode metals in the electrolyte. Therefore, it is considered that the cations are less likely to disrupt the specific adsorption of the anions to the impurities (e.g., iron) contained in the anode metal, the adsorption being directed toward the inhibition of self-discharge.

As the cations contained in the self-discharge inhibitor, in addition to the cations of the above metal, one $H^+$ or more can be contained.

Examples of the self-discharge inhibitor include, but are not limited to, $Na_2HPO_4$, $Na_3PO_4$, $Na_4P_2O_7$, $NaH_2PO_2$, $Na_2H_2P_2O_7$, $MgHPO_4$, $NaMgPO_4$, $Mg_2P_2O_7$, $MgHPO_2$, $NaMgPO_2$, $MgH_2P_2O_7$, $NaMgHP_2O_7$, $Na_2MgP_2O_7$, $KH_2PO_2$, $LiH_2PO_2$, $K_3PO_4$, $Li_3PO_4$, $K_2HPO_4$, $Li_2HPO_4$, $K_4P_2O_7$, $Li_4P_2O_7$, $K_2H_2P_2O_7$, $Li_2H_2P_2O_7$, $CaHPO_4$ and $Ca_2P_2O_7$. Of them, $Na_2H_2P_2O_7$ is preferred.

The content of the self-discharge inhibitor in the electrolyte is not particularly limited. It is preferably in the range of 0.001 mol/L or more and 0.1 mol/L or less.

The electrolyte salt is not particularly limited, as long as it is soluble in water and can offer desired ion conductivity. The electrolyte salt is preferably one that is able to make the electrolyte neutral or basic. From the viewpoint of increasing electrode reactivity, it is particularly preferable that it is one that is able to make the electrolyte basic.

The electrolyte salt is preferably one that contains at least one kind of metal selected from the group consisting of Li, K, Na, Rb, Cs, Fr, Mg, Ca, Sr, Ba and Ra. Examples of the electrolyte salt include, but are not limited to, LiCl, NaCl, KCl, $MgCl_2$, $CaCl_2$, LiOH, KOH, NaOH, RbOH, CsOH, $Mg(OH)_2$, $Ca(OH)_2$ and $Sr(OH)_2$. Of them, preferred are NaOH and KOH. Particularly preferred is NaOH.

The concentration of the electrolyte salt is not particularly limited. The lower limit is preferably 0.01 mol/L or more, more particularly 0.1 mol/L or more, still more preferably 1 mol/L or more. The upper limit is preferably 20 mol/L or less, more preferably 10 mol/L or less, still more preferably 8 mol/L or less.

When the concentration of the electrolyte salt is less than 0.01 mol/L, the solubility of the anode metal may decrease. When the concentration of the electrolyte salt is more than 20 mol/L, the self-discharge of the metal-air battery is accelerated and may reduce battery characteristics.

The pH of the electrolyte is preferably 7 or more, more preferably 10 or more, and particularly preferably 14 or more.

2. Metal-Air Battery

The metal-air battery according to embodiments is a metal-air battery comprising an air electrode configured to receive an oxygen supply; an anode containing at least one of aluminum and magnesium; and an electrolyte as set forth above, the electrolyte being in contact with the air electrode and the anode.

In embodiments, the metal-air battery is a battery in which a reduction reaction of oxygen, which is an active material, is carried out in the air electrode; an oxidation reaction of a metal is carried out in the anode; and ions are conducted by the electrolyte disposed between the air electrode and the anode. Examples of the type of the metal-air battery include, but are not limited to, a magnesium-air primary battery and an aluminum-air primary battery.

FIG. 1 is a sectional view of a schematic configuration of the metal-air battery according to an embodiment. As shown in FIG. 1, a metal-air battery 10 includes an anode 11; an air electrode 12 disposed away from the anode 11; a separator 14 retaining an electrolyte 13 disposed between the anode 11 and the air electrode 12; an anode current collector 15 connected to the anode 11; an air electrode current collector 16 connected to the air electrode 12; and an outer case 17 housing these members. The outer case 17 is partly composed of a water repellent film 18. Using the water repellent film 18 and so on, the metal-air battery 10 is composed so that the electrolyte 13 does not leak from the outer case 17.

The electrolyte which is usable in the metal-air battery of the disclosed embodiments will not be described here since it is the same as the electrolyte described above under "1. Electrolyte for metal-air batteries".

As needed, the metal-air battery of the disclosed embodiments has the separator for insulating the air electrode and the anode from each other. From the viewpoint of retaining the electrolyte, the separator preferably has a porous structure. The porous structure of the separator is not particularly limited, as long as it can retain the electrolyte. Examples include, but are not limited to, a mesh structure in which constituent fibers are regularly arranged, a non-woven fabric structure in which constituent fibers are randomly arranged, and a three-dimensional network structure which has separate holes and connected holes. As the separator, conventionally-known separators can be used. Examples include, but are not limited to, porous films made of polyethylene, polypropylene, polyethylene terephthalate, cellulose, etc., and non-woven fabrics such as a resin non-woven fabric and a glass fiber non-woven fabric.

The thickness of the separator is not particularly limited. For example, it is preferably in the range of 0.1 to 100 μm.

The porosity of the separator is preferably in the range of 30 to 90%, more preferably in the range of 45 to 70%. When the porosity is too small, the separator has a tendency to disturb ion diffusion. When the porosity is too high, the strength of the separator has a tendency to decrease.

The air electrode contains at least an electroconductive material.

The electroconductive material is not particularly limited, as long as it has electroconductivity. Examples include, but are not limited to, a carbonaceous material, a perovskite-type electroconductive material, a porous electroconductive polymer, a metal body, etc.

The carbonaceous material can be a porous or non-porous carbonaceous material. Preferably, the carbonaceous material is a porous carbonaceous material. This is because it has a large specific surface area and can provide many reaction sites. Examples of the porous carbonaceous material include, but are not limited to, mesoporous carbon. Examples of the non-porous carbonaceous material include, but are not limited to, graphite, acetylene black, carbon black, carbon nanotubes and carbon fibers.

The metal body can be suitably composed of any known metal that is stable to the electrolyte. More specifically, the metal body can be a metal body in which a metal layer (coating film) containing at least one kind of metal selected from the group consisting of, for example, Ni, Cr and Al is formed on the surface, or a metal body which is wholly composed of a metal material that is made of at least one kind of metal selected from the group consisting of Ni, Cr and Al. The form of the metal body can be a known form such as a metal mesh, a perforated metal foil or a foam metal.

The content of the electroconductive material in the air electrode is preferably in the range of 10 to 99% by mass, particularly preferably in the range of 50 to 95% by mass, when the total mass of the air electrode is determined as 100% by mass, for example.

The air electrode can contain a catalyst that promotes electrode reactions. The catalyst can be carried on the electroconductive material.

As the catalyst, a known catalyst which has an oxygen reduction ability and is usable in metal-air batteries, can be appropriately used. For example, there may be mentioned at least one kind of metal selected from the group consisting of ruthenium, rhodium, palladium and platinum; a perovskite-type oxide containing a transition metal such as Co, Mn or Fe; a metal-coordinated organic compound having a porphyrin or phthalocyanine structure; an inorganic ceramic such as manganese dioxide ($MnO_2$) or cerium oxide ($CeO_2$); and a composite material made of a mixture of the above materials.

The content of the catalyst in the air electrode is preferably in the range of 0 to 90% by mass, particularly preferably in the range of 1 to 90% by mass, when the total mass of the air electrode is determined as 100% by mass, for example.

As needed, the air electrode contains a binder for fixing the electroconductive material.

As the binder, examples include, but are not limited to, polyvinylidene fluoride (PVdF), polytetrafluoroethylene (PTFE), styrene-butadiene rubber (SBR), etc.

The content of the binder in the air electrode is not particularly limited. For example, it is preferably in the range of 1 to 40% by mass, particularly preferably in the range of 10 to 30% by mass, when the total mass of the air electrode is determined as 100% by mass.

As the method for producing the air electrode, for example, there may be mentioned a method for mixing the above-described air electrode materials (such as the electroconductive material) and roll-pressing the mixture, and a method for applying a slurry containing the above-described air electrode materials and a solvent. As the solvent used to prepare the slurry, examples include, but are not limited to, acetone, ethanol and N-methyl-2-pyrrolidone (NMP). As the method for applying the slurry, examples include, but are not limited to, a spraying method, a screen printing method, a gravure printing method, a die coating method, a doctor blade method, an inkjet method, etc. More specifically, the air electrode can be formed by applying the slurry to the below-described air electrode current collector or carrier film, drying the applied slurry, and then roll-pressing and cutting the dried slurry, as needed.

The thickness of the air electrode may vary depending on the specific application of the metal-air battery, etc. For example, it is preferably in a range of 2 to 500 μm, and particularly preferably in a range of 30 to 300 μm.

As needed, the metal-air battery of the disclosed embodiments has the air electrode current collector that collects current from the air electrode. The air electrode current collector can be one having a porous structure or one having a dense structure, as long as it has a desired electron conductivity. From the viewpoint of air (oxygen) diffusivity, it is preferably one having a porous structure such as a mesh structure. As the form of the air electrode current collector, for example, there may be mentioned a foil form, a plate form and a mesh (grid) form. The porosity of the current collector having the porous structure is not particularly limited. For example, it is preferably in the range of 20 to 99%.

As the material for the air electrode current collector, examples include, but are not limited to, stainless-steel, nickel, aluminum, iron, titanium, copper, gold, silver and palladium; carbonaceous materials such as carbon fiber and carbon paper; and highly electron conductive ceramic materials such as titanium nitride.

The thickness of the air electrode current collector is not particularly limited. For example, it is preferably in the range of 10 to 1000 μm, particularly preferably in the range of 20 to 400 μm. The below-described outer case can also function as the air electrode current collector.

The air electrode current collector can have a terminal that serves as a connection to the outside.

The anode contains at least an anode active material. As the anode active material, examples include, but are not limited to, an aluminum metal containing impurities, a magnesium metal containing impurities, an aluminum alloy, a magnesium alloy, an aluminum compound, a magnesium compound, etc. Of them, preferred is an aluminum metal containing impurities.

As the aluminum alloy, examples include, but are not limited to, an alloy of aluminum and a metal material selected from the group consisting of vanadium, silicon, magnesium, iron, zinc and lithium. The metal constituting the aluminum alloy (that is, the metal other than aluminum) can be one or more kinds of metals.

As the aluminum compound, examples include, but are not limited to, aluminum(III) nitrate, aluminum(III) chloride oxide, aluminum(III) oxalate, aluminum(III) bromide, and aluminum(III) iodide.

In the case where the anode is the aluminum metal containing impurities, the purity of the aluminum in the aluminum metal is not particularly limited. For the element ratio of the aluminum contained in the aluminum metal, the lower limit is preferably 50% or more, more preferably 80% or more, still more preferably 95% or more, particularly preferably 99.5% or more. Also for the element ratio of the aluminum contained in the aluminum metal, the upper limit can be 99.99% or less, or it can be 99.9% or less. In the aluminum metal, iron may be contained as one of the impurities. The element ratio of the iron contained in the aluminum metal is not particularly limited. It can be less than 0.01%, or it can be less than 0.1%.

In the aluminum alloy, the content of the aluminum is preferably 50% by mass or more, when the total mass of the alloy is determined as 100% by mass.

The form of the anode is not particularly limited. Examples include, but are not limited to, a plate form, a rod form, a particulate form, etc. From the viewpoint of the form that can easily increase the performance of the metal-air battery, a particulate form is preferred. When the anode is in a particulate form, the lower limit of the diameter of the particles is preferably 1 nm or more, more preferably 10 nm or more, still more preferably 100 nm or more, and the upper limit of the diameter of the particles is preferably 100 mm or less, more preferably 10 mm or less, still more preferably 1 mm or less.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical, Such a particle diameter calculation by TEM or SEM observation is carried out on 200 to 300 particles of the same type, and the average of the particles is determined as the average particle diameter.

As needed, the anode contains at least one of the electroconductive material and the binder for fixing the anode active material. For example, when the anode active material is in a plate form, the anode can be an anode that contains only the anode active material. On the other hand, when the anode active material is a powder (particulate) form, the anode can be an anode that contains the anode active material and at least one of the electroconductive material and the binder. The type and amount of the electroconductive material used, the type and amount of the binder used, etc., can be the same as those of the air electrode described above.

As needed, the anode has the anode current collector that collects current from the anode. The material for the anode current collector is not particularly limited, as long as it is electroconductive. Examples include, but are not limited to, stainless-steel, nickel, copper and carbon. As the form of the anode current collector, examples include, but are not limited to, a foil form, a plate form, and a mesh form. The thickness of the anode current collector is not particularly limited. For example, it is preferably in the range of 10 to 1000 μm, and particularly preferably in the range of 20 to 400 μm. The below-described outer case can also function as the anode current collector.

The anode current collector can have a terminal that serves as a connection to the outside.

The metal-air battery of the disclosed embodiments generally has the outer case for housing the air electrode, the anode, the electrolyte, etc.

As the form of the outer case, examples include, but are not limited to, a coin form, a flat plate form, a cylindrical form and a laminate form.

The material for the outer case is not particularly limited, as long as it is stable to the electrolyte. Examples include, but are not limited to, a metal body that contains at least one kind of metal selected from the group consisting of Ni, Cr and Al, and a resin such as polypropylene, polyethylene or acrylic resin. In the case where the outer case is the metal body, the outer case can be such that only the surface is composed of the metal body, or such that the outer case is wholly composed of the metal body.

The outer body can be an open-to-the-atmosphere type or a hermetically-closed type. The open-to-the-atmosphere type outer case has an opening for taking in oxygen from the outside (i.e., an oxygen inlet) and has a structure that allows at least the air electrode to be in sufficient contact with the atmosphere. The oxygen inlet can be provided with an oxygen permeable film, water repellent film, etc. The hermetically-closed type battery case can have an oxygen (air) inlet tube and an outlet tube.

The water repellent film is not particularly limited, as long as it is made of a material that does not leak the electrolyte and allows the air to reach the air electrode. As the water repellent film, examples include, but are not limited to, a porous fluorine resin sheet (such as PTFE) and water-repellent, porous cellulose.

An oxygen-containing gas is supplied to the air electrode. As the oxygen-containing gas, examples include, but are not limited to, air, dry air, pure oxygen, etc. The oxygen-containing gas is preferably dry air or pure oxygen, particularly preferably pure oxygen.

EXAMPLES

Example 1

First, an aqueous solution of 1 mol/L NaOH (manufactured by Kanto Chemical Co., Inc.) was prepared. The aqueous solution was kept in a thermostatic bath (product name: LU-113; manufactured by: ESPEC Corp.) at 25° C. for 8 hours. Then, as a self-discharge inhibitor, $Na_2HPO_4.12H_2O$ (manufactured by Aldrich) was added to the aqueous solution so as to be 0.01 mol/L. Next, the aqueous solution was stirred with an ultrasonic washing machine for 15 minutes. Then, the aqueous solution was kept in the thermostatic bath at 25° C. for 3 hours, thereby obtaining an electrolyte for metal-air batteries.

Example 2

An electrolyte for metal-air batteries was produced in the same manner as Example 1, except that $Na_2HPO_4.12H_2O$ was changed to $Na_3PO_4.12H_2O$ (manufactured by Aldrich).

Example 3

An electrolyte for metal-air batteries was produced in the same manner as Example 1, except that $Na_2HPO_4.12H_2O$ was changed to $Na_4P_2O_7$ (manufactured by Aldrich).

Example 4

An electrolyte for metal-air batteries was produced in the same manner as Example 1, except that $Na_2HPO_4.12H_2O$ was changed to $NaH_2PO_2.H_2O$ (manufactured by Aldrich).

Example 5

An electrolyte for metal-air batteries was produced in the same manner as Example 1, except that $Na_2HPO_4.12H_2O$ was changed to $Na_2H_2P_2O_7$ (manufactured by Aldrich).

Comparative Example 1

An electrolyte for metal-air batteries was produced in the same manner as Example 1, except that $Na_2HPO_4.12H_2O$ was not added.

Comparative Example 2

An electrolyte for metal-air batteries was produced in the same manner as Example 1, except that $Na_2HPO_4.12H_2O$ was changed to $NaH_2PO_4.H_2O$ (manufactured by Aldrich).

[Evaluation of Self-Discharge Inhibition]
(Preparation of Electrodes)

As a working electrode, an aluminum plate having a purity of 99.5% (product name: Al2N; manufactured by: Nilaco Corporation) and being cut into a size of 25 mm×25 mm×1 mm was prepared. The surface of the aluminum plate was wiped with acetone. Then, the aluminum plate was sandwiched between nickel meshes (product name: 20 mesh; manufactured by Nilaco Corporation) and the edges of the nickel meshes were welded to each other. A nickel ribbon (manufactured by Nilaco Corporation) was welded thereto and used as a current collection wiring.

As a counter electrode, a nickel mesh (product name: 200 mesh; manufactured by: Nilaco Corporation) cut into a size of 30 mm×30 mm×1 mm, was prepared. A nickel ribbon was welded to the nickel mesh and used as a current collection wiring.

As a reference electrode, an Hg/HgO electrode was prepared.

(Production of Evaluation Cells)

As electrolytes, the electrolytes of Examples 1 to 5 and Comparative Examples 1 and 2 were prepared (55 mL each).

Seven cell containers were prepared (the number of the cell containers is equal to the total number of the electrolytes of Examples 1 to 5 and Comparative Examples 1 and 2). In each cell container (volume 60 mL), the working electrode, the counter electrode and the reference electrode were placed. The electrolytes (55 mL each) were separately put in the cell containers. The cell containers were capped to prevent volatilization, thereby preparing evaluation cells. The production of the evaluation cells was carried out within 10 minutes.

(Measurement of Open-Circuit Potential Holding Time)

For each of the evaluation cells using the electrolytes of Examples 1 to 5 and Comparative Examples 1 and 2, the open-circuit potential (OCV) holding time of the aluminum electrode (working electrode) was measured. In particular, the working and counter electrodes of each evaluation cell were connected to a potentiostat/galvanostat (product name: VMP3; manufactured by: Biologic); an open circuit was created at an ambient temperature of 25° C. for 30 hours; and the time for the potential of the working electrode to change from about −1.3 V (vs. Hg/HgO) at the beginning of the measurement to −0.8 V (vs. Hg/HgO) was measured.

The open-circuit potential holding time means a time during which the self-discharge reaction proceeds and the aluminum electrode is completely eluted. Accordingly, it is considered that as the open-circuit potential holding time increases, the self-discharge rate decreases, thereby inhibiting self-discharge. The results of the measurement of the open-circuit potential holding time are shown in Table 1.

Comparative Example 2 with respect to Comparative Example 1, are as follows; 113% in Example 1; 102% in Example 2; 119% in Example 3; 133% in Example 4; 252% in Example 5; and 91% in Comparative Example 2.

Therefore, it is clear that the open-circuit potential holding times of the aluminum electrodes of Examples 1 to 5 are longer than Comparative Example 1. Especially in the case of Example 5 in which $Na_2H_2P_2O_7$ was used as the self-discharge inhibitor, it is clear that there is such a remarkable self-discharge inhibiting effect that the open-circuit potential holding time is 2.52 times longer than Comparative Example 1.

The reason why the self-discharge inhibiting effect varies depending on the anion species (phosphoric acid species) contained in the self-discharge inhibitor, is not clear. Without intending to be bound by theory, it is believed to be due to a change in the negative charge of P coordinated to P. For example, as the number of O coordinated to P decreases, the negative charge of O decreases.

In the case of the self-discharge inhibitor in which $H^+$ is not contained, it is also presumed that when the self-discharge inhibitor is dissolved in the electrolyte and $Na^+$ does not completely dissociate, the negative charge of O decreases. It is presumed that due to the above-described slight decrease in the negative charge of the anions, the adsorption of the anions to iron was changed, so that the self-discharge inhibiting effect was changed.

[EDX analysis of Electrode Surface]

First, 50 mL of the electrolyte of Example 5 was put in a container. Next, an aluminum plate having a purity of 99.5% (product name: Al2N; manufactured by: Nilaco Corporation) and being cut into a size of 12 mm×12 mm×1 mm (about 0.4 g) was prepared. The surface of the aluminum plate was wiped with acetone. Then, the aluminum plate was put in the container. A paper was placed on the top of the container, and the container was loosely capped. Thereby, hydrogen was prevented from remaining in the container, and natural volatilization of the electrolyte was inhibited. Then, the container was put in a thermostatic bath and kept at 25° C. for 3 hours. Then, energy dispersive X-ray analysis

TABLE 1

| | Self-discharge inhibitor | Open-circuit potential holding time (sec) | Increase rate (%) |
|---|---|---|---|
| Example 1 | $Na_2HPO_4 \cdot 12H_2O$ | 27666 | 113 |
| Example 2 | $Na_3PO_4 \cdot 12H_2O$ | 25118 | 102 |
| Example 3 | $Na_4P_2O_7$ | 29291 | 119 |
| Example 4 | $NaH_2PO_2 \cdot H_2O$ | 32670 | 133 |
| Example 5 | $Na_2H_2P_2O_7$ | 61807 | 252 |
| Comparative Example 1 | — | 24557 | 100 |
| Comparative Example 2 | $NaH_2PO_4 \cdot H_2O$ | 22235 | 91 |

As shown in Table 1, the open-circuit potential holding times of the evaluation cells using the electrolytes of Examples 1 to 5 and Comparative Examples 1 and 2, are as follows; 27666 seconds in Example 1; 25118 seconds in Example 2; 29291 seconds in Example 3; 32670 seconds in Example 4; 61807 seconds in Example 5; 24557 seconds in Comparative Example 1; and 22235 seconds in Comparative Example 2.

Figure 2:
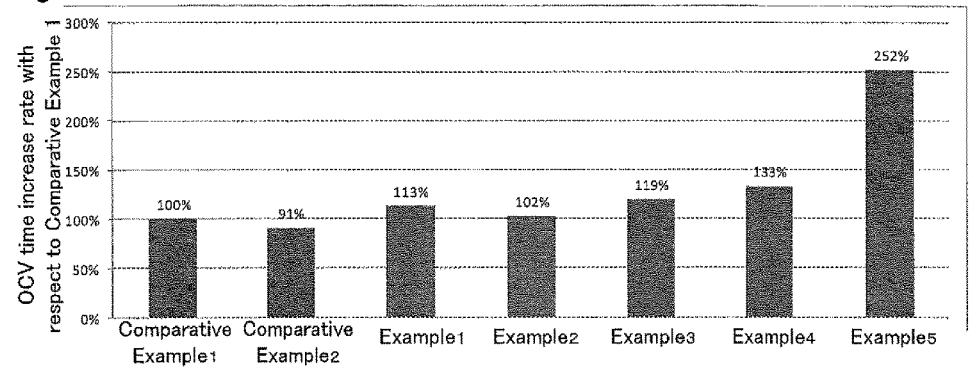
FIG. 2 is a bar graph comparing the open-circuit potential holding times of Examples 1 to 5 and Comparative Example 2, with Comparative Example 1.

FIG. 2 is a bar graph comparing the open-circuit potential holding times of Examples 1 to 5 and Comparative Example 2, with Comparative Example 1.

As shown in Table 1 and FIG. 2, the increase rates of the open-circuit potential holding times of Examples 1 to 5 and (EDX) was carried out on the surface of the aluminum plate. The results are shown in Table 2.

TABLE 2

| | Al electrode surface (atom %) | Discharge product surface (atom %) |
|---|---|---|
| Al | 98.18 | 35.04 |
| Fe | 0.98 | 42.45 |
| Si | 0.27 | 2.64 |
| P | 0.26 | 1.78 |
| O | 0.17 | 11.93 |

As shown in Table 2, the atomic composition ratio of the aluminum metal surface (base) exposed on the aluminum plate surface is as follows: Al is 98.18 atom %; Fe is 0.98 atom %; Si is 0.27 atom %; P is 0.26 atom %; and O is 0.17 atom %. Meanwhile, the atomic composition ratio of the discharge product surface exposed on the aluminum plate surface is as follows: Al is 35.04 atom %; Fe is 42.45 atom %; Si is 2.64 atom %; P is 1.78 atom %; and O is 11.93 atom %.

Therefore, as shown in Table 2, on the aluminum metal surface (base), Fe is 0.98 atom % and P is 0.26 atom %; meanwhile, on the discharge product surface in which iron, which is one of the impurities, was incorporated, Fe is 42.45 atom % and this is very large. P is 1.78 atom %, and it was confirmed that the abundance of P on the discharge product surface is about seven times larger than the atomic composition ratio of the aluminum metal surface (base). Accordingly, since almost no P exists on the aluminum metal surface (base) and P exists mostly on the discharge product surface, it is considered that the anion species (phosphoric acid species) contained in the self-discharge inhibitor more preferentially adsorb onto the surface of the iron, which is one of the impurities contained in the aluminum metal, than onto the aluminum metal surface.

Due to the above, by the use of the self-discharge inhibitor, the anion species contained in the self-discharge inhibitor preferentially adsorb onto the surface of the iron, which is one of the impurities contained in the aluminum metal, so that direct contact of the iron with the electrolyte is inhibited. As a result, it is considered that the local cell formation is inhibited, so that the self-discharge of the metal-air battery is inhibited.

Even in the case where the magnesium metal was used in the anode, it is considered that the anions contained in the self-discharge inhibitor more preferentially adsorb onto the surface of the iron, which is one of the impurities contained in the magnesium metal, than onto the magnesium metal surface, since magnesium is a metal that is, like aluminum, electrochemically baser than iron.

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

The invention claimed is:

1. An electrolyte for metal-air batteries having an anode containing at least one of aluminum and magnesium, the electrolyte comprising an aqueous solution comprising at least one self-discharge inhibitor selected from the group consisting of $MH_2PO_2$, $LHPO_4$, and $MLPO_4$,
where M is any one selected from the group consisting of Li, Na, Rb, Cs and Fr, and L is any one selected from the group consisting of Mg, Ca, Sr, Ba and Ra,
wherein a content of the self-discharge inhibitor is in the range of 0.001 mol/L or more to 0.1 mol/L or less.

2. The electrolyte according to claim 1, wherein the aqueous solution is basic.

3. The electrolyte according to claim 1, wherein the aqueous solution further comprises an electrolyte salt.

4. The electrolyte according to claim 3, wherein the electrolyte salt is NaOH.

5. The electrolyte according to claim 3, wherein a content of the electrolyte salt is in the range of 0.01 mol/L or more to 20 mol/L or less.

6. A metal-air battery comprising:
an air electrode configured to receive an oxygen supply;
an anode containing at least one of aluminum and magnesium; and
an electrolyte according to claim 1, the electrolyte being in contact with the air electrode and the anode.

7. The metal-air battery according to claim 6, further comprising a separator disposed between the air electrode and the anode, the separator configured to retain the electrolyte.

8. The metal-air battery according to claim 7, wherein the separator is porous.

9. The metal-air battery according to claim 8, wherein the porosity of the separator is in the range of 30% to 90%.

10. The metal-air battery according to claim 6, wherein a thickness of the air electrode is in the range of 2 µm to 500 µm.

11. The metal-air battery according to claim 6, wherein the aluminum is an aluminum metal containing impurities, and an element ratio of the aluminum in the aluminum metal is in the range of 50% or more to 99.99% or less.

12. The metal-air battery according to claim 6, wherein the aluminum is an aluminum alloy, and a content of the aluminum in the aluminum alloy is 50% by mass or more.

* * * * *